(12) United States Patent
Hayes et al.

(10) Patent No.: US 10,990,997 B1
(45) Date of Patent: Apr. 27, 2021

(54) SYSTEM FOR PROCESSING A DIGITAL PROMOTION BASED UPON GUEST CHECK IMAGE AND RELATED METHODS

(71) Applicant: INMAR CLEARING, INC., Winston-Salem, NC (US)

(72) Inventors: Jeffery Hayes, Seattle, WA (US); Lee Lovett, Springfield, PA (US); Nathanael Georgeson, Seattle, WA (US); O'Ryan McEntire, Seattle, WA (US); Samuel May, Kent, WA (US); Tyler Lenderman, Seattle, WA (US); Zackary Smith, Seattle, WA (US); Ryan Halper, New York, NY (US)

(73) Assignee: INMAR CLEARING, INC., Winston-Salem, NC (US)

( * ) Notice: Subject to any disclaimer, the term of this patent is extended or adjusted under 35 U.S.C. 154(b) by 121 days.

(21) Appl. No.: 16/173,021

(22) Filed: Oct. 29, 2018

(51) Int. Cl.
*G06Q 30/02* (2012.01)
*G06Q 20/04* (2012.01)

(52) U.S. Cl.
CPC ....... *G06Q 30/0234* (2013.01); *G06Q 20/047* (2020.05); *G06Q 30/0238* (2013.01)

(58) Field of Classification Search
CPC ............. G06Q 30/0234; G06Q 20/047; G06Q 30/0238
See application file for complete search history.

(56) References Cited

U.S. PATENT DOCUMENTS

| | | | | |
|---|---|---|---|---|
| 2014/0278903 | A1* | 9/2014 | Wang | G06Q 30/0234 705/14.34 |
| 2016/0063532 | A1* | 3/2016 | Loeb | G06F 40/205 705/14.25 |
| 2017/0132656 | A1* | 5/2017 | Marcus | G06Q 20/32 |
| 2017/0193543 | A1* | 7/2017 | Priebatsch | G06Q 20/3224 |
| 2018/0183737 | A1* | 6/2018 | Subbarayan | G06Q 20/3223 |
| 2018/0308122 | A1* | 10/2018 | Moore | G06Q 30/0242 |
| 2019/0102813 | A1* | 4/2019 | O'Neill | H04L 51/32 |

OTHER PUBLICATIONS

F. Chou, "The Best Way to Use Facebook Messenger Bots to Sell Online With ManyChat", available on Oct. 11, 2018, retrieved from https://mywifequitherjob.com/facebook-messenger-marketing-for-ecommerce/ (Year: 2018).*

* cited by examiner

*Primary Examiner* — Sam Refai
(74) *Attorney, Agent, or Firm* — Allen, Dyer, Doppelt, + Gilchrist, P.A. Attorneys at Law (57) ABSTRACT

A system for processing a digital promotion may include a mobile wireless communications device and a digital promotion server. The digital promotion server may be configured to operate a messenger bot to communicate a digital promotion for a given product to the mobile wireless communications device. The digital promotion may be redeemable at a redemption location. The digital promotion server may be configured to obtain an image of a guest check associated with a purchase transaction at the redemption location, and determine whether the given product is indicated on the image of the guest check, and when so, cooperate with the redemption location to redeem the digital promotion for the given product during the purchase transaction.

17 Claims, 6 Drawing Sheets

SYSTEM FOR PROCESSING A DIGITAL PROMOTION BASED UPON GUEST CHECK IMAGE AND RELATED METHODS

TECHNICAL FIELD

The present invention relates to the field of electronics, and more particularly, to messenger bot based communications and related methods.

BACKGROUND

Sales of a particular product or service may be based upon how well that product or service is marketed to a consumer. One form of marketing is a coupon, typically in paper form, for a discount toward the product or service. Some coupons may be retailer specific, for example, only redeemable for the discount at a particular retailer, while other coupons may be product specific from a manufacturer and redeemable at any retailer.

A coupon, while typically in paper form, may be in digital form and may be referred to as a digital promotion. A digital promotion may be selected or "clipped" via a mobile phone and saved to a digital wallet for redemption at a point-of-sale (POS) terminal, for example. A typical coupon is applicable to a given product and has a redeemable value that may vary based upon, for example, the quantity of a given item, brand of item, size of the product in terms of packaging, and/or the price point of the given item. A typical coupon may also be redeemable only at a given retailer and/or within a threshold time period.

An electronic messenger program or instant messenger is a computer program that permits real time text transmission over a computer network, for example, the Internet. One type of electronic messenger program or instant messenger is a chat or messenger bot, which is a computer program that provides conversation, for example, by way of text. The conversation may mimic human conversation. A messenger bot may be particularly useful for customer service or information acquisition applications.

SUMMARY

A system for processing a digital promotion may include a mobile wireless communications device and a digital promotion server. The digital promotion server may be configured to operate a messenger bot to communicate a digital promotion for a given product to the mobile wireless communications device. The digital promotion may be redeemable at a redemption location. The digital promotion server may be configured to obtain an image of a guest check associated with a purchase transaction at the redemption location, and determine whether the given product is indicated on the image of the guest check, and when so, cooperate with the redemption location to redeem the digital promotion for the given product during the purchase transaction.

The system may further include a point-of-sale (POS) terminal at the redemption location, and the digital promotion server may be configured to cooperate with the POS terminal to redeem the digital promotion, for example. The POS terminal may be configured to acquire the image of the guest check and communicate the image of the guest check to the digital promotion server.

The mobile wireless communications device may include a camera cooperating with a mobile device processor to acquire the image of the guest check and communicate the image of the guest check to the digital promotion server, for example. The digital promotion server may be configured to obtain the image of the guest check via the messenger bot.

The digital promotion may have a redemption value associated therewith; and wherein the digital promotion server is configured to apply a credit to the guest check in an amount equal to the redemption value, for example. The redemption value may correspond to an entire purchase price of the given product, for example.

The digital promotion server may be configured to determine whether the given product is indicated on the image of the guest check based upon an optical character recognition. The digital promotion server may be configured to operate the messenger bot to collect at least one of a user name, social media profile, user date of birth, user geographic location, and desired product from a brand thereof, for example.

A method aspect is directed a method of processing a digital promotion. The method may include using a digital promotion server to operate a messenger bot to communicate a digital promotion for a given product to a mobile wireless communications device. The digital promotion may be redeemable at a redemption location. The method may further include using the digital promotion server to obtain an image of a guest check associated with a purchase transaction at the redemption location, and determine whether the given product is indicated on the image of the guest check, and when so, cooperate with the redemption location to redeem the digital promotion for the given product during the purchase transaction.

A computer readable medium aspect is directed to a non-transitory computer readable medium for processing a digital promotion. The non-transitory computer readable medium has computer executable instructions that when executed by a processor cause the processor to perform operations. The operations may include operating a messenger bot to communicate a digital promotion for a given product to a mobile wireless communications device. The digital promotion being redeemable at a redemption location. The operations may also include obtaining an image of a guest check associated with a purchase transaction at the redemption location, and determining whether the given product is indicated on the image of the guest check, and when so, cooperating with the redemption location to redeem the digital promotion for the given product during the purchase transaction.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternative embodiments.

Figure 1:
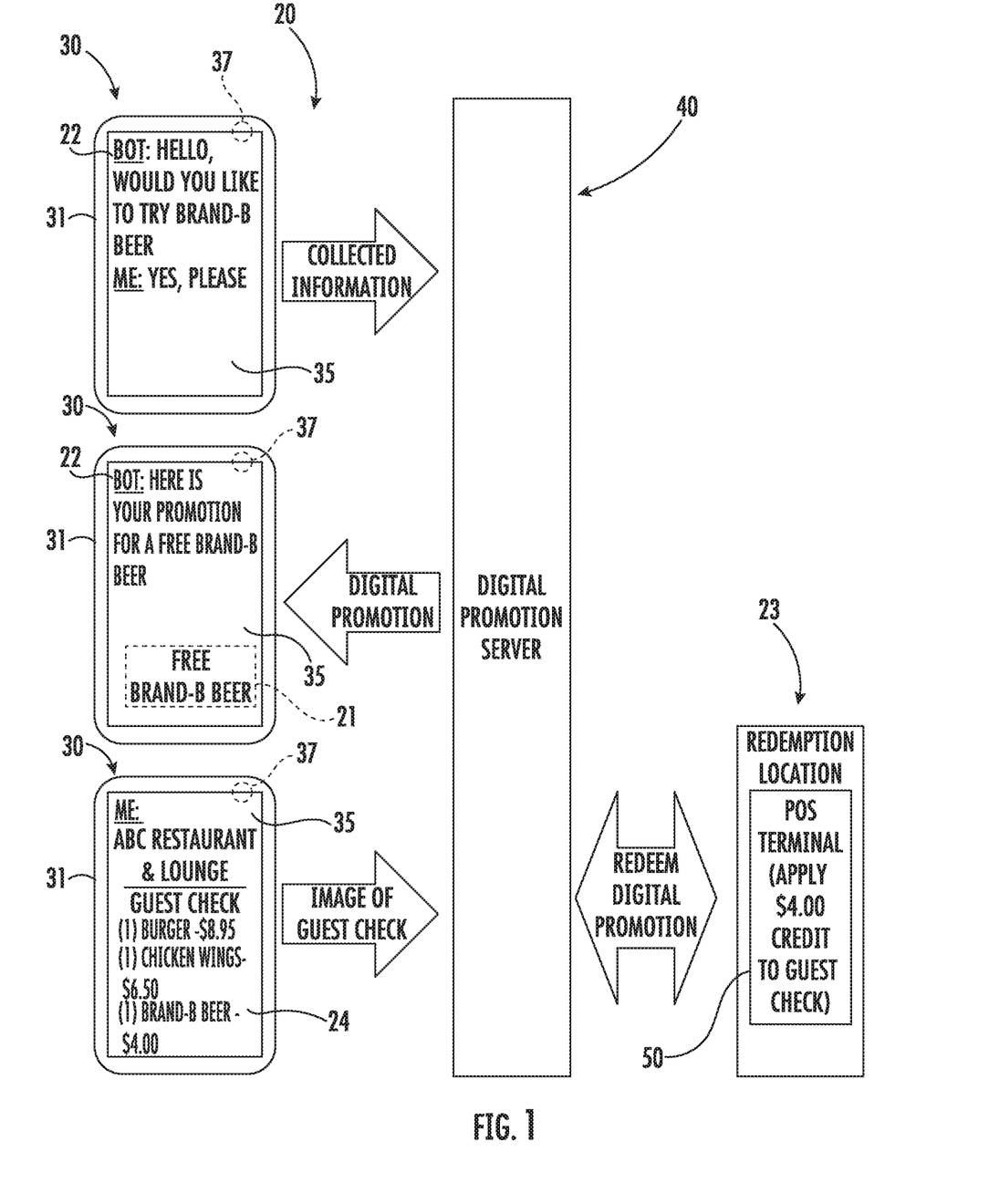
FIG. 1 is a schematic diagram of a system for processing a digital promotion in accordance with an embodiment.
Figure 2:
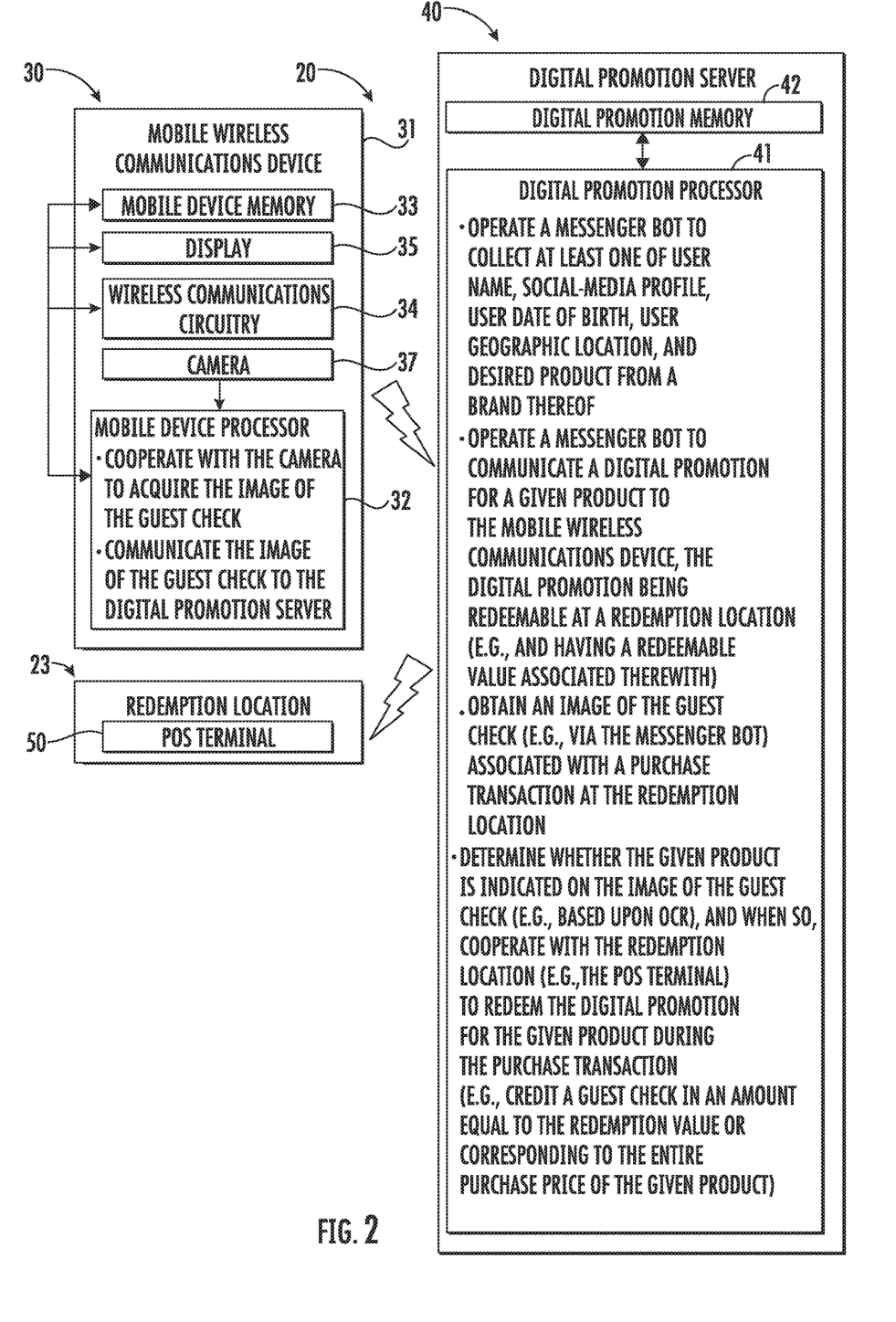
FIG. 2 is another schematic diagram of a system for processing a digital promotion in accordance with another embodiment.

Referring initially to FIGS. 1 and 2, a system 20 for processing a digital promotion includes a mobile wireless communications device 30. The mobile wireless communications device 30 illustratively includes a portable housing 31, a mobile device processor 32, a mobile device memory 33 coupled to the mobile device processor, and wireless communications circuitry 34 coupled to the mobile device processor. The mobile wireless communications device 30 also includes a display 35, such as, for example, a touch display, carried by the portable housing 31 and coupled to the mobile device processor 32. The mobile wireless communications device 30 may include one or more input devices, for example, a camera 37 and other types of output devices. The mobile wireless communications device 30 may be a mobile phone or smartphone, a tablet computer, or other type of mobile wireless communications device, as will be appreciated by those skilled in the art.

The system 20 also includes a digital promotion server 40 communicatively coupled to the mobile wireless communications device 30. The digital promotion server 40 includes a digital promotion processor 41 and a digital promotion memory 42 coupled to the digital promotion processor. The digital promotion server 40 may be a remote computer, for example.

Figure 3:
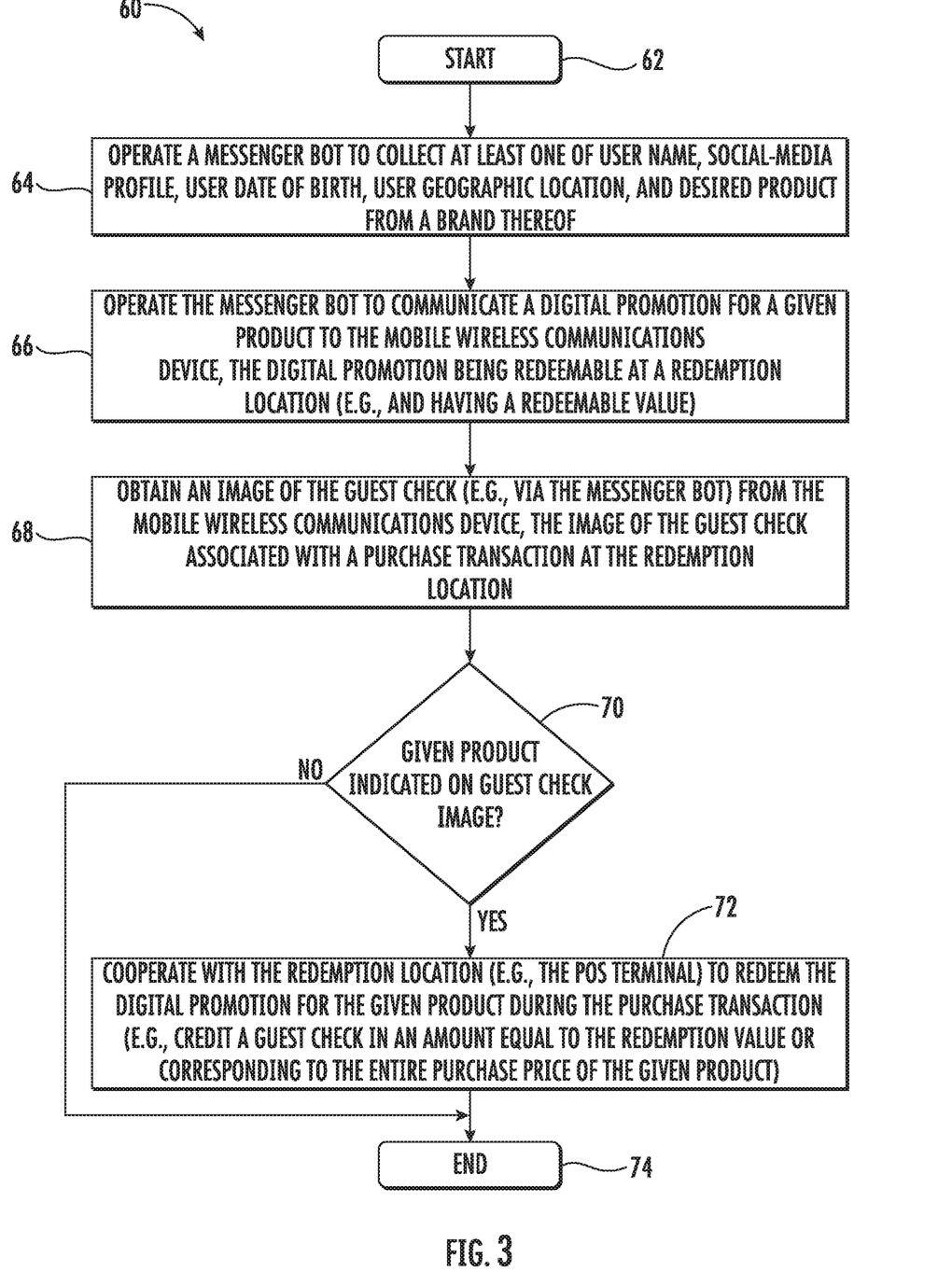
FIG. 3 is a flow chart illustrating operation of the digital promotion server of FIG. 2.

Referring now additionally to the flowchart 60 in FIG. 3, details of operation of the system 20 will now be described with reference to the digital promotion server 40. It should be understood that while operations are described with respect to the digital promotion server 40, the operations are performed based upon cooperation between the digital promotion processor 41 and the digital promotion memory 42.

Beginning at Block 62, the digital promotion server 40 operates a messenger bot 22, for example that may be associated with a given product or brand of products. The messenger bot 22 is operated by the digital promotion server 40 on the mobile wireless communications device 30 (Block 64). The digital promotion server 40 operates the messenger bot 22 to collect information from a user. For example, through the messenger bot 22, the digital promotion server 40 may obtain the given user's name, social media username, email address, social media profile, date of birth, geographic location, and/or desired product from the brand. Of course, the digital promotion server 40 may collect other and/or additional types of information.

At Block 66, the digital promotion server 40 operates the messenger bot 22 to communicate, for example, wirelessly, a digital promotion 21, via the messenger bot 22 for the given product to the mobile wireless communications device 30. The digital promotion 21 may be redeemable at one or more redemption locations 23, for example, a restaurant, bar, etc. Of course, the digital promotion 21 may be redeemable at other types of redemption locations 23 and for other types of products. In some embodiments, the digital promotion 21 may be redeemable at one or more redemption locations 23, for example, based upon user selection. The digital promotion 21 may have a redemption value associated therewith. The redemption value may be for a fraction of the total cost of the given product or the full or entire purchase price of the given product. In some embodiments, the redemption value may also include taxes and gratuities.

The given product may be a brand and/or class or type of product, for example, and thus, as described above, the messenger bot 22 may be associated with a given brand. The digital promotion 21 may be displayed on the display 35 of the mobile wireless communications device 30, for example, inline in a social media feed. An exemplary digital promotion 21 may be along the lines of "Enjoy a Brand-B Beer On Brand-B". Of course, the digital promotion 21 may be included on a website, in an email, and/or other electronic form.

The messenger bot 22 may be implemented in the form of a two-way dialog box that permits the given user to communicate by way of typing (i.e., written communication). In some embodiments, the messenger bot 22 may operate through voice commands or spoken words. The underlying program behind the messenger bot 22 may be a different program, application, and/or website than that serving the digital promotion 21. For example, the digital promotion 21 may be inline in a news feed on Facebook while the messenger bot 22 may be executed through the Facebook Messenger program or application. The application or program associated with the messenger bot 22 may be executed or opened, for example, based upon user selection of the digital promotion 21.

The digital promotion server 40 obtains an image of a guest check 24 associated with a purchase transaction at the redemption location 23. More particularly, at Block 68, the camera 37 of the mobile wireless communications device 30 cooperates with the mobile device processor 32 to acquire the image of the guest check 24. The mobile wireless communications device 30 communicates, for example, wirelessly, the image of the guest check 24 to the digital promotion server 40, for example, via the messenger bot 22. As will be appreciated by those skilled in the art, the image of the guest check 24 includes a listing of products, quantities, and corresponding prices. With respect to the beer example described above, the image of the guest check 24 may include such items as a Burger for $8.95, Chicken Wings for $6.50, and a Brand-B Beer for $4.00.

The digital promotion server 40, at Block 70, determines whether the given product is indicated on the image of the guest check 24. The digital promotion server 40 may use image or text recognition techniques, for example, optical character recognition, to determine whether the given product is indicated on the image of the guest check 24. With respect to the Brand-B Beer example, the digital promotion server 40 determines whether Brand-B Beer is indicated (e.g., printed) on the image of the guest check 24. Other and/or additional verification techniques may be used to determine whether the header (e.g., name, address, logo, and/or phone number of restaurant, bar, retailer) of the guest check 24 indicates the redemption location 23, or selected or permissible redemption locations. Still further, an identification associated with the user, e.g., username, social media handle, mobile wireless communications device identifier, etc. may be used for additional verification, for example, to reduce chances of fraud.

When at Block 70 it is determined that the given product is indicated on image of the guest check 24, the digital promotion server 40 cooperates with the redemption location 23, for example, via or within the messenger bot 22, to redeem the digital promotion 21 for the given product during the purchase transaction (Block 72). More particularly, the digital promotion server 40 cooperates with a point-of-sale terminal 50 at the redemption location 23 to redeem the digital promotion 21. For example, with respect to the Brand-B Beer example, the digital promotion server 40 may communicate with the POS terminal 50 to apply a credit to the guest check 24 in an amount equal to the redemption value. Thus, if the Brand-B Beer were $4.00 as described above, a $4.00 credit may be applied to the corresponding guest check 24 based upon the communication between the digital promotion server 40 and the POS terminal 50. In some embodiments, the digital promotion server 40 may communicate with the mobile wireless communications device 30 to display a confirmation of redemption. If the given product is not indicated on the guest check image, then the operations end at Block 74.

Figure 4:
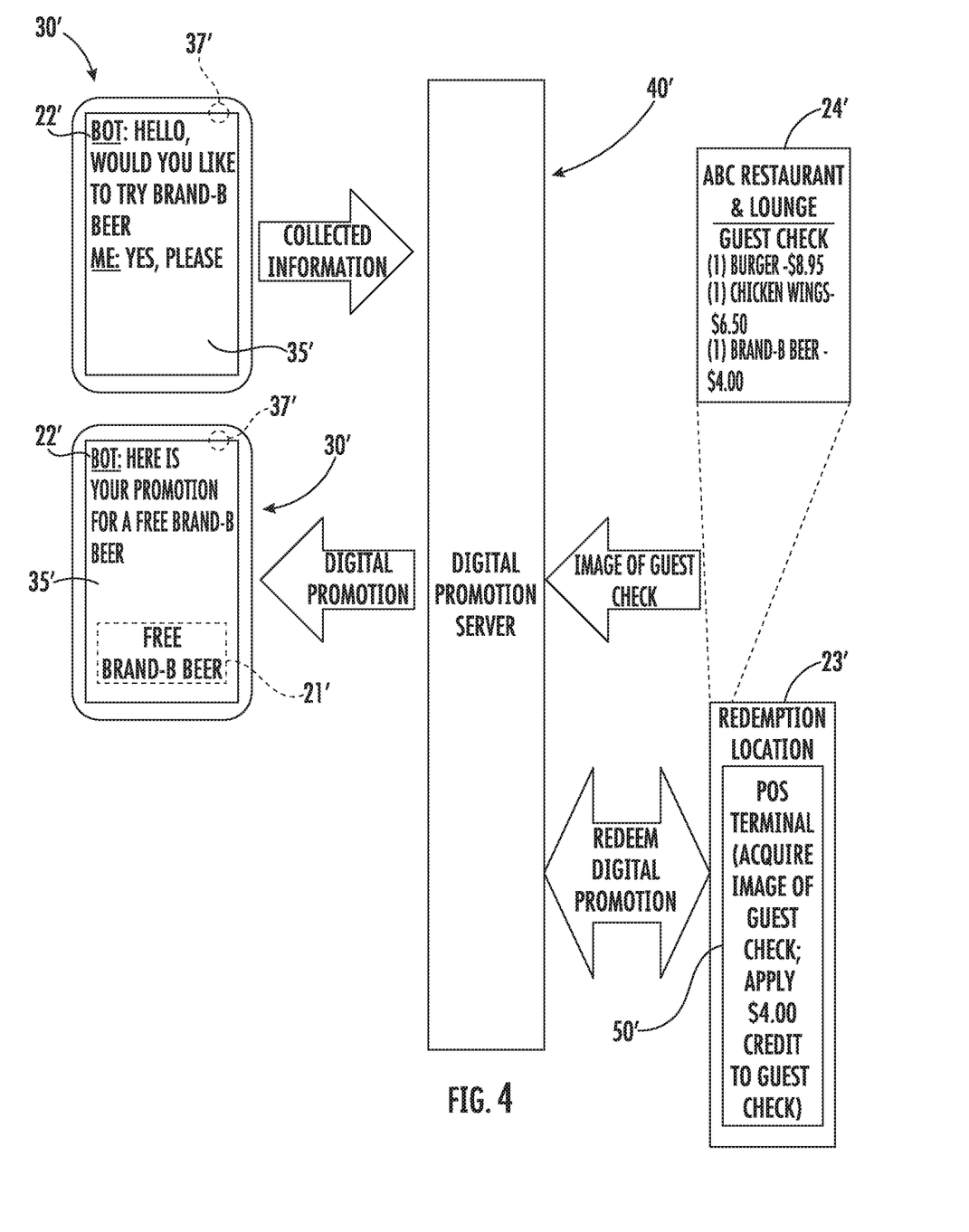
FIG. 4 is a schematic diagram of a system for processing a digital promotion in accordance with an embodiment.
Figure 5:
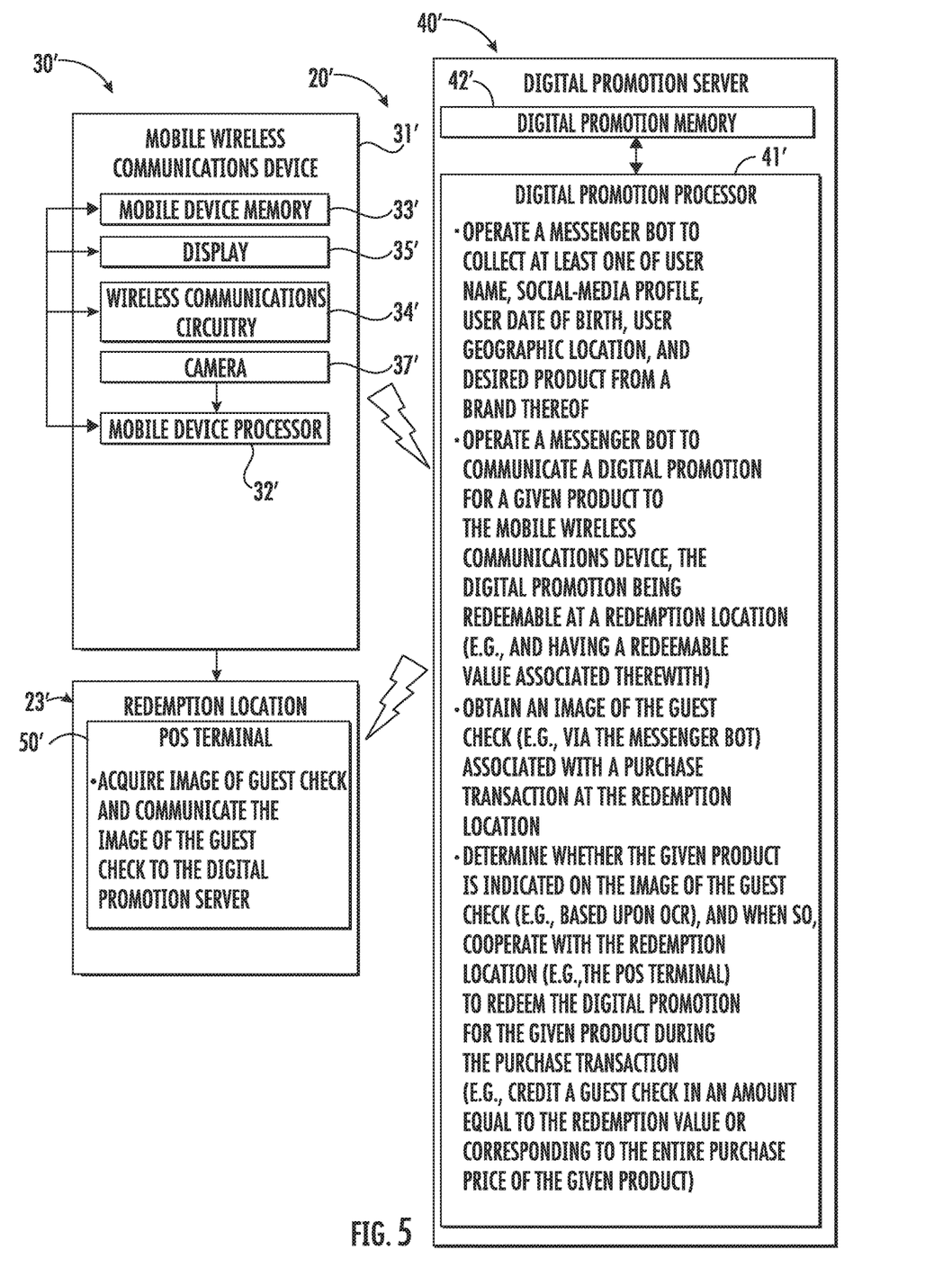
FIG. 5 is a schematic diagram of a system for processing a digital promotion in accordance with another embodiment.
Figure 6:
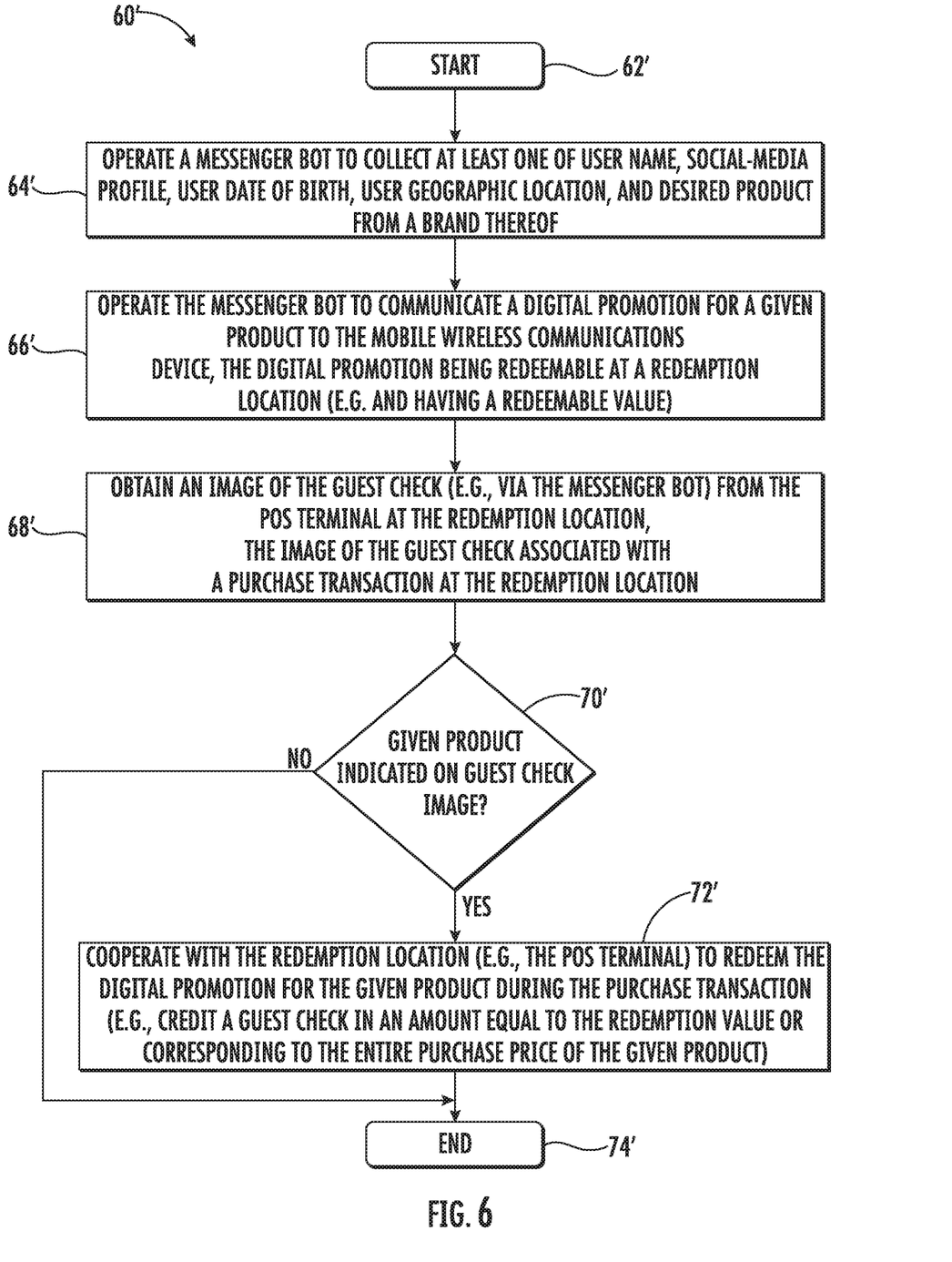
FIG. 6 is a flow chart illustrating operation of the digital promotion server of FIG. 5.

Referring briefly to FIGS. 4 and 5, and the flowchart 60' in FIG. 6, in another embodiment, the digital promotion server 40' may obtain the image of the guest check 24' associated with the purchase transaction at the redemption location 23' from the POS terminal 50' instead of the camera 37' of the mobile wireless communications device 30' (Block 68'). More particularly, the user or staff at the redemption location 23' may scan, using an optical scanner or camera, the guest check either at the POS terminal 50' or using a peripheral device associated with or part of the POS terminal. The remainder of the operations and elements, for example, those illustrated in FIGS. 4 and 5, but not specifically described, are similar to the embodiments described above with respect to FIGS. 1-3 and need no further discussion.

As will be appreciated by those skilled in the art, the system 20 described herein involves specialized or improved technology through communication from the communication with the messenger bot 22 to the redemption, for example, at the POS terminal 50 at the redemption location 23. In other words, the digital promotion server 40 is programmed to perform specialized functions that bridge operation of the messenger bot 22 to the redemption of the digital promotion 21 at POS terminal 50.

A method aspect is directed a method of processing a digital promotion 21. The method includes using a digital promotion server 40 to operate a messenger bot 22 to communicate a digital promotion 21 for a given product to a mobile wireless communications device 30. The digital promotion 21 is redeemable at a redemption location 23. The method further includes using the digital promotion server 40 to obtain an image of a guest check 24 associated with a purchase transaction at the redemption location 23, and determine whether the given product is indicated on the image of the guest check, and when so, cooperate with the redemption location to redeem the digital promotion 21 for the given product during the purchase transaction.

A computer readable medium aspect is directed to a non-transitory computer readable medium for processing a digital promotion 21. The non-transitory computer readable medium has computer executable instructions that when executed by a processor 41 cause the processor to perform operations. The operations include operating a messenger bot 22 to communicate a digital promotion 21 for a given product to a mobile wireless communications device 30. The digital promotion 21 being redeemable at a redemption location 23. The operations also include obtaining an image of a guest check 24 associated with a purchase transaction at the redemption location 23, and determining whether the given product is indicated on the image of the guest check, and when so, cooperating with the redemption location to redeem the digital promotion 21 for the given product during the purchase transaction.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A system for processing a digital promotion comprising:
    a point-of-sale (POS) terminal at a redemption location;
    a mobile wireless communications device associated with a given user; and
    a digital promotion server configured to
        cooperate with the mobile wireless communications device to display thereon a digital promotion, the digital promotion being for a given product,
        based upon user selection of the digital promotion at the mobile wireless communications device, operate a messenger bot permitting a two-way dialog between the given user and the messenger bot to generate a dialog prompting, via the messenger bot, the given user for interest in the given product,
        upon receiving a response to the prompt within the dialog via the messenger bot that the given user has interest in the given product, communicate, via the messenger bot, the digital promotion for the given product to the mobile wireless communications device, the digital promotion being redeemable at the redemption location, and
        obtain, via the messenger bot, an image of a guest check associated with a purchase transaction at the redemption location, and
    determine whether the given product is indicated on the image of the guest check based upon optical character recognition, and when so, cooperate with the POS terminal at the redemption location to redeem the digital promotion for the given product during the purchase transaction.

2. The system of claim 1 wherein the mobile wireless communications device comprises a camera cooperating with a mobile device processor to acquire the image of the guest check and communicate the image of the guest check to the digital promotion server.

3. The system of claim 1 wherein the digital promotion has a redemption value associated therewith; and wherein the digital promotion server is configured to apply a credit to the guest check in an amount equal to the redemption value.

4. The system of claim 3 wherein the redemption value corresponds to an entire purchase price of the given product.

5. The system of claim 1 wherein the digital promotion server is configured to operate the messenger bot to collect at least one of a user name, social media profile, user date of birth, user geographic location, and desired product from a brand thereof.

6. A digital promotion server for processing a digital promotion comprising:
    a processor and an associated memory configured to
        cooperate with a mobile wireless communications device associated with a given user to display thereon a digital promotion, the digital promotion being for a given product,
        based upon user selection of the digital promotion at the mobile wireless communications device, operate a messenger bot permitting a two-way dialog between the given user and the messenger bot to
generate a dialog prompting, via the messenger bot, the given user for interest in the given product,
upon receiving a response to the prompt within the dialog via the messenger bot that the given user has interest in the given product, communicate, via the messenger bot, the digital promotion for the given product to the mobile wireless communications device, the digital promotion being redeemable at a point-of-sale (POS) terminal at a redemption location, and
obtain, via the messenger bot, an image of a guest check associated with a purchase transaction at the redemption location, and
determine whether the given product is indicated on the image of the guest check based upon optical character recognition, and when so, cooperate with the POS terminal at the redemption location to redeem the digital promotion for the given product during the purchase transaction.

7. The digital promotion server of claim 6 wherein the digital promotion has a redemption value associated therewith; and wherein the processor and associated memory are configured to apply a credit to the guest check in an amount equal to the redemption value.

8. A method of processing a digital promotion comprising:
using a digital promotion server to
cooperate with a mobile wireless communications device associated with a given user to display thereon a digital promotion, the digital promotion being for a given product,
based upon user selection of the digital promotion at the mobile wireless communications device, operate a messenger bot permitting a two-way dialog between the given user and the messenger bot to
generate a dialog prompting, via the messenger bot, the given user for interest in the given product,
upon receiving a response to the prompt within the dialog via the messenger bot that the given user has interest in the given product, communicate, via the messenger bot, the digital promotion for the given product to the mobile wireless communications device, the digital promotion being redeemable at a point-of-sale (POS) terminal at a redemption location, and
obtain, via the messenger bot, an image of a guest check associated with a purchase transaction at the redemption location, and
determine whether the given product is indicated on the image of the guest check based upon optical character recognition, and when so, cooperate with the POS terminal at the redemption location to redeem the digital promotion for the given product during the purchase transaction.

9. The method of claim 8 wherein the digital promotion has a redemption value associated therewith; and wherein the digital promotion server is used to apply a credit to the guest check in an amount equal to the redemption value.

10. A non-transitory computer readable medium for processing a digital promotion, the non-transitory computer readable medium having computer executable instructions that when executed by a processor cause the processor to perform operations comprising:
cooperating with a mobile wireless communications device associated with a given user to display thereon a digital promotion, the digital promotion being for a given product;
based upon user selection of the digital promotion at the mobile wireless communications device, operating a messenger bot permitting a two-way dialog between the given user and the messenger bot to
generate a dialog prompting, via the messenger bot, the given user for interest in the given product,
upon receiving a response to the prompt within the dialog via the messenger bot that the given user has interest in the given product, communicate, via the messenger bot, the digital promotion for the given product to the mobile wireless communications device, the digital promotion being redeemable at a point-of-sale (POS) terminal at a redemption location, and
obtain, via the messenger bot, an image of a guest check associated with a purchase transaction at the redemption location; and
determining whether the given product is indicated on the image of the guest check based upon optical character recognition, and when so, cooperating with the redemption location to redeem the digital promotion for the given product during the purchase transaction.

11. The non-transitory computer readable medium of claim 10 wherein the digital promotion has a redemption value associated therewith; and wherein the operations comprise applying a credit to the guest check in an amount equal to the redemption value.

12. The digital promotion server of claim 7 wherein the redemption value corresponds to an entire purchase price of the given product.

13. The digital promotion server of claim 6 wherein the processor is configured to operate the messenger bot to collect at least one of a user name, social media profile, user date of birth, user geographic location, and desired product from a brand thereof.

14. The method of claim 9 wherein the redemption value corresponds to an entire purchase price of the given product.

15. The method of claim 8 wherein using the digital promotion server comprises using the digital promotion server to operate the messenger bot to collect at least one of a user name, social media profile, user date of birth, user geographic location, and desired product from a brand thereof.

16. The non-transitory computer readable medium of claim 11 wherein the redemption value corresponds to an entire purchase price of the given product.

17. The non-transitory computer readable medium of claim 10 wherein the operations comprise operating the messenger bot to collect at least one of a user name, social media profile, user date of birth, user geographic location, and desired product from a brand thereof.

* * * * *